United States Patent [19]

Boston

[11] Patent Number: 5,457,015

[45] Date of Patent: Oct. 10, 1995

[54] SILVER HALIDE COATED ORGANIC POLYMERIC FILMS UTILIZING CHITOSAN ACID SALT ANTISTATIC PROTECTION LAYERS

[75] Inventor: David R. Boston, Woodbury, Minn.

[73] Assignee: Minnesota Mining and Manufacturing Company, St. Paul, Minn.

[21] Appl. No.: 243,957

[22] Filed: May 17, 1994

Related U.S. Application Data

[62] Division of Ser. No. 753,863, Sep. 3, 1991, Pat. No. 5,348,799.

[51] Int. Cl.⁶ .................................................. G03C 1/85
[52] U.S. Cl. ........................ 430/529; 430/527; 430/530
[58] Field of Search .................................. 430/527, 528, 430/529, 530

[56] References Cited

U.S. PATENT DOCUMENTS

| | | |
|---|---|---|
| 3,245,833 | 4/1966 | Trevey et al. . |
| 3,874,879 | 4/1975 | Rasch . |
| 4,134,412 | 1/1979 | Gross et al. . |
| 4,373,013 | 2/1983 | Yoshizumi ............................. 428/570 |
| 4,383,022 | 5/1983 | Berger .................................... 430/228 |
| 4,394,441 | 7/1983 | Kawaguchi et al. .................. 430/524 |
| 4,436,731 | 3/1984 | Maltz ........................................ 424/18 |
| 4,585,730 | 4/1986 | Cho ......................................... 430/527 |
| 4,701,403 | 10/1987 | Miller ..................................... 430/529 |
| 4,895,792 | 1/1990 | Aizawa .................................. 430/530 |
| 5,213,887 | 5/1993 | Huffman ............................... 428/323 |
| 5,348,799 | 9/1994 | Boston .................................. 428/323 |

FOREIGN PATENT DOCUMENTS

| | | |
|---|---|---|
| 0198246A1 | 3/1986 | European Pat. Off. . |
| 1-159640 | 12/1987 | Japan . |
| 3189859A | 5/1988 | Japan . |
| 3213839A | 6/1988 | Japan . |
| 3-111840 | 9/1989 | Japan . |
| 3-157481 | 7/1991 | Japan . |

OTHER PUBLICATIONS

Encyclopedia of Polymer Science and Engineering, 1987 "Chitin", pp. 430–441.

Journal of Membrane Science, 16 (1983) 295–308 "The Characterization of N–Methyl, N–Ethyl, N–Propyl, N–Butyl and N–Hexyl Chiosans, Novel Film–Forming Polymers".

"PROTAN Biopolymers".

Primary Examiner—Charles L. Bowers, Jr.
Assistant Examiner—Christopher G. Young
Attorney, Agent, or Firm—Gary L. Griswold; Walter N. Kirn; Susan Moeller Zerull

[57] ABSTRACT

A reduction of static buildup on surfaces can be accomplished by providing a coating which is the dried and reacted product of an aqueous composition of chitosan salt and inorganic metal oxide sol. A stable, static reducing coating on polymeric substrates is particularly useful in photographic media.

3 Claims, No Drawings

SILVER HALIDE COATED ORGANIC POLYMERIC FILMS UTILIZING CHITOSAN ACID SALT ANTISTATIC PROTECTION LAYERS

This is a division of application Ser. No. 07/753,863 filed Sep. 3, 1991, now U.S. Pat. No. 5,348,799.

BACKGROUND OF THE INVENTION

1. Field of the Invention

The present invention relates to the prevention of static buildup on polymeric materials by the addition of antistatic layers to those materials. In particular, the invention relates to antistatic coatings in association with imageable materials.

2. Background of the Art

Many different polymeric materials have been long recognized as suffering from electrostatic charge buildup during use. The problems associated with such static charging may be as modest as sparks from moving about on polymeric carpeting and popping sounds on phonograph records or as serious as memory erasure on computer disks and false artifacts in photographic film.

One usual method of reducing static buildup is the addition of a conductive layer or low surface resistivity layer to the polymeric article. It is common in the protection of shaped polymeric articles, including carpets, to treat the polymer with reactive or absorbable salts (e.g., U.S. Pat. Nos. 3,309,223 and 4,313,978). It is also known to form layers of inorganic metal oxides, either in film or particulate form to decrease the surface resistivity (e.g., U.S. Pat. Nos. 4,203,769 and 4,394,441). These antistatic coatings are known to be particularly desirable and useful as subbing layers in photographic articles (e.g., U.S. Pat. No. 3,874,879).

Chitosan is an organic material derived from the shells of arthropods such as shrimp, crab, and lobster. Chemically, it is a d-glucosamine. Chitosan and its derivatives have been known to be used in diffusion transfer films (e.g., U.S. Pat. Nos. 4,386,151 and 4,383,022), cosmetic base (e.g., EPO 0 198 246), in paper products as an absorbent (e.g., JP 62-064803), and as part of a particulate antistatic coating on the back side of photographic base, especially photographic paper (JP 62-319842). The chitosan in that Japanese Patent Publication may be mixed with colloidal silica or alumina and may contain other additives such as antistatic modifiers. The solution is preferably coated at a pH above 5.0 to prevent effects on the photographic emulsion. The coatings are not transparent and the resistivity of compositions within and outside the invention are similar, suggesting little antistatic effect from the chitosan.

SUMMARY OF THE INVENTION

An aqueous solution of a chitosan-acid salt in combination with an anionic inorganic metal oxide colloidal suspension is coated at a pH of less than 4.0 onto the surface of a polymeric material and dried. The resulting substantially optically clear and transparent coating comprising the inorganic metal oxide bonded or adsorbed to a chitosan polymer phase is an effective and stable antistatic protection layer.

DETAILED DESCRIPTION OF THE INVENTION

The antistatic coatings of the present invention are particularly beneficial and capable of a broad range of use at least in part because of their optical transparency, water-insolubility, and low surface resistivity. Optical transparency is important when the protected substrate or article is to be imaged, viewed, or projected. Water-insolubility is significant where the antistatic layer is a surface layer or the article is to be treated or processed in aqueous solutions. Low surface resistivity is an indication of the degree of efficiency which the antistatic layer is capable of providing.

The protective layer of the present invention is formed by the application of an aqueous coating composition onto the surface of a polymeric substrate. The coating composition must contain a colloidal dispersion of an anionic inorganic metal oxide in an aqueous solution of a chitosan acid salt. The colloidal dispersion must be of an anionic inorganic metal oxide to enable the chitosan acid salt to react and bond or adsorb thereto. The chitosan must be in the form of an acid salt in order for it to be in solution. If the chitosan is not in solution, it would not coat out as a distinct phase but would be deposited as a mixture of chitosan film and particles. Even when dissolved, some minor amount of the chitosan acid salt may appear as particles when deposited, but most of the chitosan (at least 90%, preferably at least 95% to 100%) will be present as a film or phase extending between the inorganic oxide particles.

One measurement of antistatic property is the surface resistivity of a coating. The units for measuring surface resistivity are ohms per square. The measurement relates to the ability of the coating to dissipate surface static electric charges. The lower the resistivity, the better that property is. Surface resistivity numbers in the $10^{9-10^{11}}$ ohms/sq are considered to be 'good' for static protection. The other measurement used in determining antistatic protection is that of charge decay. In measuring this quality, an electric charge (measured in volts) is applied to the surface of the film and the time in seconds for the electric field generated by the surface to zero is measured. For excellent static protection, the charge decay time (+5000 v to '0') should be less than one second, and preferably less than 0.1 second. As a rule of thumb, if the charge decay time is 0.10 sec. or less (0.01 sec is the detection limit of many instruments), then the antistatic coating is effective for use as an underlayer. In this case, poorly conductive coatings are applied over the antistatic coating. Obviously, low surface resistivity is not directly important in this application because the surface of the antistatic coating is buried under non-conducting materials. Nevertheless, static protection is provided in an indirect manner insofar as the conductive layer is able to neutralize the external electric field of the surface static charges by formation of an internal electric field. This type of protection is effective for, e.g., the prevention of 'static cling' between sheets and with dust particles. This type of static protection is particularly notable in some commercial film, which have relatively poor surface resistivity ($10^{13}$ ohms/sq), but extremely low charge decay times. Other new photographic films have both good charge decay and surface resistivity properties.

An important distinction among antistatic coatings is the type of conductor. They can be either ionic conductors or electronic conductors. In general, if the surface resistivity and charge decay properties depend on the amount of moisture in the air, the coating is termed an ionic conductor, and if the properties do not depend on humidity, it is an electronic conductor.

The above serves to distinguish the chitosan/sol antistats of the present application. First, the chitosan/sol coatings are ionic-type conductors, that is the conductive property depends on the amount of moisture in the air. However, in our case, the dependency is not great, as the coatings are still functional as antistatic underlayers even at 15% RH and 20°

C. (depending on thickness and chitosan level). Typical surface resistivity values of the coatings (before they are overcoated) are $1\times10^8$ to $5\times10^9$ ohms/sq. Typical charge decay numbers after overcoating are 0.01 sec. at 40% RH.

The chitosan/sol coatings have many beneficial properties. They are antireflective, and so increase the light transmission at certain wavelengths depending on the coating thickness. The adhesion of the coatings is excellent to chemical primers with acid functionality, and to physically modified film (e.g., corona treated). Chitosan is fully compatible with gelatin, and undergoes the same crosslinking reactions; therefore the adhesion is excellent.

Furthermore, chitosan does not interfere with any of the photographic properties of graphic arts film. Therefore it can be used as an underlayer on the light-sensitive side of the assemblage as well as on the non-light-sensitive side; or it can be applied as with normal subbings, to both sides of the base film. Also, it can be used as an antistatic topcoat. The coatings of this invention also exhibit a low contact angle with water, which makes it useful as a subbing for high speed coating. When chitosan is used as a low molecular weight polymer, it shows the property of migrating into the gelatin-containing layers, and imparts improved surface resistivity to them. For instance, the surface resistivity of an overcoated emulsion layer might increase from $5\times10^{13}$ ohms/sq. without the coating to about $1\times10^{11}$ with the low molecular weight coating of the invention as an underlayer. It is notable here that some newer antistatic photographic films add an ionic polymer to the gelatin-containing layer above the antistatic layer which is different than the polymer in the antistatic layer.

The coating weight of the antistatic layers of the invention will be less than 0.6 g/meter$^2$ and preferably less than 0.2 g/meter$^2$, on each surface of the film in a two-sided application.

The colloidal inorganic oxide solution or dispersion used in the present invention comprises finely divided solid inorganic metal oxide particles in a liquid. The term "solution" as used herein includes dispersions or suspensions of finely divided particles of ultramicroscopic size in a liquid medium. The solutions used in the practice of this invention are clear to milky in appearance. Inorganic metal oxides particularly suitable for use in the present invention are those in which the metal oxide particles are negatively charged (anionic), which includes, for example, tin oxide ($SnO_2$), titania, antimony oxide ($Sb_2O_5$), silica, and alumina-coated silica as well as other inorganic metal oxides of Groups III and IV of the Periodic Table and mixtures thereof which form negatively charged sols. The selection of the inorganic metal oxide is dependent upon the ultimate balance of properties desired.

The colloidal coating solution preferably contains about 0.2 to 15 weight percent, more preferably about 0.5 to 8 weight percent, colloidal inorganic metal oxide particles. At particle concentrations above about 15 weight percent, the resulting coating may have reduced uniformity in thickness and exhibit reduced adhesion to the substrate surface. Difficulties in obtaining a sufficiently thin coating to achieve increased light transmissivity may also be encountered at concentrations above about 15 weight percent. At concentrations below 0.2 weight percent, process inefficiencies result due to the large amount of liquid which must be removed and beneficial properties may be reduced.

The thickness of the applied wet coating solution is dependent on the concentration of inorganic metal oxide particles and chitosan in the coating solution and the desired thickness of the dried coating. The thickness of the wet coating solution is preferably such that the resulting dried coating thickness is from about 75 to 800 nm thick, more preferably about 100 to 300 nm thick.

The coating solution may also optionally contain a surfactant to improve wettability of the solution on the substrate, but inclusion of an excessive amount of surfactant may reduce the adhesion of the coating to the substrate. Suitable surfactants for this system would include compatible surface-tension reducing organic liquids such as n-propanol, and surfactants which are salts of very strong acids such as naphthalene sulfonic acid or perfluorooctyl sulfonic acid. Generally the surfactant can be used amounts of up to about 0.5 weight percent of the solution.

The coating solution may optionally contain a very small amount of polymeric binder, particularly a hydrophilic polymer binder, to improve scratch resistance, or to reduce formation of particulate dust during subsequent use of the coated substrate, or to control or increase the surface sensitivity of the antistatic layer. Useful polymeric binders include polyvinyl alcohol, polyvinyl acetate, gelatin, polyesters, polyamides, polyvinyl pyrrolidone, copolyesters, copolymers of acrylic acid and/or methacrylic acid, and copolymers of styrene. The coating solution can contain up to about 5 or 10 weight percent of the polymeric binder based on the weight of the inorganic metal oxide particles. Useful amounts of polymeric binder are generally in the range of about 0.1 to 5 weight percent. These binders can reduce some of the beneficial properties (e.g., antistatic properties) of the coatings if used in larger amounts, so that they are not most preferred.

The average primary particle size of the colloidal inorganic metal oxide particles is generally less than 50 nm, preferably less than 20 nm, and more preferably less than 10 nm. Some very useful commercial colloidal suspensions have average primary particle sizes less than 7 nm. Examples of commercially available colloidal inorganic metal oxide solutions are Nalco™ 2326, colloidal silica; Nalco™ 1115, colloidal silica; Nalco™ 1060, colloidal silica; Nalco™ 1034A, colloidal silica, Nalco™ T-2588, colloidal titania; 1SJ-612 colloidal silica/alumina; and Nyacol SN-20, colloidal stannic oxide.

The coating solution of chitosan and inorganic metal oxide solution usually comprises from 1 to 65% by weight solids of the polymer and 99 to 35% by weight solids of the inorganic metal oxide particles. The coating composition more preferably contains from 3 to 40% by weight solids of the polymer and 97% to 60% of the inorganic metal oxide particles. More preferably the composition comprises 8 to 25% by weight solids of the chitosan and 92 to 75% by weight of the inorganic metal oxide particles.

The coating composition should be applied in sufficient amounts to the surface so that a dried coating of 25–2000 nm is produced. Preferably the coating is 50–1200 nm dried thickness. More preferably the dried coating is 75–800 nm in thickness and the most preferred coating thickness is about 100–300 nm.

Chitosan is an organic polymeric material derived from chitin. Chitin is the most abundant organic skeletal component of invertebrates and is the characteristic polysaccharide of such phyla as Arthopoda, Annelida, Mollusca, and Coelenterata. Chitin can be described as (1– 4)-linked 2-acetamido-2-deoxy-o-b-glucan. Chitosan is obtained from chitin by deacetylation of the chitin, usually by strong alkalis. After deacetylation, the chitosan will contain from 5 to 8% nitrogen, mostly in the form of primary amino groups.

The amino group on the chitosan may be alkylated (preferably $C_1$ to $C_{12}$ alkylation, most preferably methylated or ethylated). This alkylated chitosan offers some significant processing advantages during coating. Some acid salts of chitosan are known to form reticulate structures upon coating. The presence of the alkylated (secondary) amine group greatly reduces the tendency of the dried chitosan to form a reticulated structure. A smoother film characteristic is produced with the alkylated chitosan. Increasing the molecular weight of the chitosan also helps to reduce reticulation in the final coating.

The chitosan, either alkylated or not, is mixed with an acid to form an aqueous soluble salt. The acid used to form the salt should be at least as acidic as acetic acid (e.g., $pKa \leq 5.0$) such as, for example, acetic acid, nitric acid, hydrochloric acid, hydrobromic acid, nitrous acid, benzoic acid, maleic acid, hydrofluoric acid, boric acid, phosphoric acid, phosphonic acid, trifluoromethane sulfonic acid, etc. An acid which forms a chitosan sulfate is not useful as the sulfate salt tends to be uniquely water insoluble.

The aqueous soluble chitosan acid salt is then mixed with the inorganic metal oxide solution and maintained at a pH less than 4.0. It is important to keep the solution mixture of chitosan salt and inorganic oxide at this low pH in order to keep the materials in solution. At higher pH levels, the chitosan will eventually precipitate, or the mixture will gel. If such higher pH aqueous compositions are coated, there would be no continuous phase of chitosan (there would be bound particulates) and, more importantly, the coated layer would not be optically transparent but would be at least milky. It is more preferred that the pH of the composition be maintained below 3.50 and more preferably that the pH be maintained between 1.50 and 3.50, preferably between 2.50 and 3.25. This stable coating composition is then coated onto the substrate and dried. Drying may be by air drying, forced air drying, oven drying, infrared heating, or the like. Typically oven drying between 40° and 120° C. is preferred.

When coated out and dried, the chitosan polymer (having cationic groups thereon) absorbs to the surface of anionic metal oxide particles. This is a very strong adsorption which binds the polymer (chitosan) strongly to the particles. The chitosan forms a film or phase which bonds the particles together. Some of the particles may also be touching and may be bonded together by gelling, chemical linkages, or other bonding forces.

As previously noted, other ingredients such as surface active agents, coating aids, polymers, antistatic modifiers, antihalation dyes, gelatin, polysaccharides, ultraviolet radiation absorbers, coupling agents, bonding aids, and the like may be included in the coating solution. These and other aspects of the invention will be shown in the following non-limiting examples.

Measurement of antistatic property: Two methods were used to measure the effectiveness of the antistatic layer. In the principal method, an ETS Charge Decay Meter, Model # 406C was utilized to measure the time in seconds for an applied surface electric charge of +5000 volts to decay to 'zero'. This will be referred to as the Charge Decay (CD) time. The second less preferred method, was done to provide an alternative reference. The Surface Resistivity (SR) of the layer in Ohms/sq. was measured with a Keithley Model 6105 Resistivity Adaptor combined with a Keithley 610B Electrometer and a 500 v power source.

EXAMPLE 1

Preparation of chitosan nitrate salt: Low molecular weight ground chitosan (Sea Cure™ 143 from Protan Inc., Raymond Wash. USA) was utilized as follows: 40 g of Sea Cure™ 143 chitosan was slurried with 900 ml of deionized water. With rapid mixing, 16 g of conc. nitric acid (70 wt %) was added. After about 1-2 hours of mixing the pH of the solution was checked and found to be 4.2. This value will vary since Sea Cure™ 143 is not a pure product. The pH should be no higher than 4.7. If necessary it may be adjusted to 4.7 by adding 1N $HNO_3$ dropwise to the stirred solution as it is monitored by a pH meter. The total weight of the solution was adjusted to 1000 g with water and the solution was filtered through cheesecloth to remove debris. Chitosan nitrate salt content was 5%±0.1%.

Preparation of sol/chitosan nitrate Mixture 1: 141.7 g of Remasol™ SP-30 colloidal silica (Remet Corp.) was combined with 2.62 g of conc. nitric acid while stirring rapidly. The colloidal suspension remained clear, without precipitation. Then 250 g of the above chitosan nitrate solution was added. Next, deionized water was added to a total weight of 950 g. The pH of the mixture was 3.0±0.2. The total weight was adjusted to 1000 g with water. Appearance of the mixture was clear to very slightly hazy. Percent solids was 5±0.1%.

Preparation of coated Sample 1: Mixture 1 was coated onto 6"×12" (15.2×30.4 cm) sheets of 4 mil (0.1 mm) PET film which had been commercially primed with a PVDC-containing terpolymer. Coating was accomplished by drawing down a bead of the solution over the film using a #6 wire-wound rod. The coated film was dried for 2 minutes in a counter-flow oven at 100° C. Appearance of the coatings was variable, from clear to hazy.

Preparation of comparative samples: Comparative sample 'A' was prepared as follows: 16.7 g. of Remasol SP-30 colloidal silica was combined with 83.3 g. of water, and 0.3 g. of 10% Triton X-100 surfactant was added. This mixture was coated by draw-down onto a 6"×12" PET/PVDC sheet using a #6 wire-wound rod, and dried for 2 minutes at 100° C. Comparative sample 'B' was prepared as follows: Ten grams of the chitosan nitrate salt solution was mixed with 0.14 g. of 37% formaldehyde, and then coated onto a 6"×12" PET/PVDC sheet with a #6 wire-wound rod. The sample was dried at 50° C. for 2 minutes.

Preparation of gel-overcoated Samples 1, A, and B: Samples 1, A, and B were overcoated with a gelatin solution as follows: Five grams of K&K 1312 gelatin was combined with 95 g. of water. The gelatin was allowed to swell for one hour, and then dissolved at 45° C. Next, 1.3 g. of 3.7% formaldehyde solution and 0.35 g. of 10% Triton X-200 surfactant were added. This gel solution was coated over the samples 1, A and B by drawn-down with a #24 wire-wound rod. The coatings were dried for 30 minutes at 50° C. The overcoated samples were completely clear in appearance, indicating that the haze of the sol/chitosan coating had been a surface property.

Antistatic property: The overcoated samples were tested for CD and then the same samples were subjected to photographic processing in an automatic graphic arts type processing unit utilizing 3MRPD Developer and 3M GFC Fixer. Following processing the samples were re-tested for CD. Results are in Table 1.

TABLE 1

| | CD (sec) of Gel-overcoated Samples 1, A, and B | | | |
|---|---|---|---|---|
| | before processing | | after processing | |
| | as is | OC | as is | OC |
| Sample 1 | 0.02 | 0.35 | 1.21 | 1.67 |
| Sample A | 0.07 | >100 | 1.98 | >100 |
| Sample B | 0.22 | >100 | >100 | >100 |

Conclusion: When used as a buried conductive layer (as in the overcoated samples) a large improvement in conductive property of inventive Sample I over either of the two comparative samples is indicated.

EXAMPLE 2

Preparation of N-alkylated chitosan nitrate salts:

a) Preparation of N-methylated chitosan nitrate salt: 3200 ml of deionized water was heated to 85° C. and 100 g of high molecular weight chitosan (Sea Cure™ 340, Protan Inc.) was added with rapid stirring. Next, 75 g of conc. nitric acid was added. The mixture was heated and stirred for one hour, after which it was cooled to room temperature. The viscosity of the solution was about 8 cps (Brookfield). Stirring was initiated again, and a solution of 15 g NaOH dissolved in 200 g of water was added slowly. Then 40 ml of methyl iodide ($CH_3I$) was added, and stirring was continued for 6 hours. A solution of 18 g of NaOH in 250 ml of water was prepared and added slowly while the pH was monitored until the pH was about 7. The resulting precipitate was filtered through cheesecloth and washed twice with 4 liter portions of water. The wet precipitate was slurried in water to make about two liters, and then concentrated nitric acid was added slowly until the precipitate was dissolved and a pH of 4.7 was reached (about 45 g of acid required). The percent solids was determined by drying 10 g of the solution overnight at 50° C., and then the total volume of the solution was adjusted to make 5.0% solids. Incorporation of methyl groups was estimated at 25 mole % by NMR.

b) Preparation of N-butylated chitosan nitrate salt: 400 g of low molecular weight 5% chitosan nitrate salt solution (described in Example 1) was added to a 2 liter Erlenmeyer flask and diluted to 1000 g with water. With vigorous stirring, 4.0 ml of 1-butyl iodide and 20 ml of p-dioxane were added. A uniform dispersion was produced. Next, 2.75 g of NaOH dissolved in 150 ml water was slowly added. This mixture was heated to 70° C. and maintained at that temperature for 5 hours, after which the mixture was clear. 2.5 g of NaOH in 100 ml water was added and the resulting precipitate was filtered and washed as above. The wet precipitate was dissolved with 9 g of conc. nitric acid and diluted to 200 g with water. Then the solid chitosan nitrate derivative was precipitated by addition of 2 liters of acetone to the aqueous solution. The precipitate was collected by suction filtration and dried at 50° C.

c) Preparation of N-octylated chitosan nitrate salt: Reaction conditions and sequence are the same as in b) above, except that 6.4 g of 1-octyl iodide was used in place of butyl iodide. Upon reacidification the octyl derivative would not completely dissolve in 200 ml of water. Therefore one liter of methanol was added to attain solution of the nitrate salt and then 3 liters of acetone were added to precipitate the solid salt. The precipitate was collected by suction filtration and dried at 50° C.

Preparation of sol/chitosan salt mixtures: Mixture 1: 10 g of Remasol™ SP-30 colloidal silica was acidified with 0.19 g of conc. nitric acid. Then 10 g of solution 2-a was added with stirring. The mixture was diluted to a total weight of 100 g with water. Mixture 2: 0.5 g of N-butylated chitosan nitrate salt was dissolved in 20 g of water. Next, 10 g of Remasol™ SP-30 was acidified with 0.19 g of conc. nitric acid. The chitosan solution was added to the sol, and diluted with water to a total weight of 100 g. Mixture 3: 0.5 g of N-octylated chitosan nitrate salt was mixed with 20 ml water. The solid was partially dissolved. Nex, 10 g of Remasol™ SP-30 was combined with 0.19 g of conc. nitric acid and then the chitosan mixture was added. 20 ml of methanol was added to clear the solution and then water was added to a total weight of 100 g.

Preparation of sample coatings: Sample 2-1: Mixture 1 was coated onto a 6"×12" corona-treated PET sheet by draw-down with a #6 wire-wound rod and dried at 50° C. for 2 minutes. Samples 2-2 and 2-3 were prepared similarly from mixtures 2 and 3 respectively. In each case, a clear coating was obtained, in contrast to the hazy coating of Example One.

Antistatic Property: CD of samples 2-1, 2-2, and 2-3 was <0.10 sec and SR was of the order $10^8$ ohms/sq.

Conclusion: N-alkylation of chitosan is shown not to interfere with the antistatic property of sol/chitosan mixtures. Also, the tendency for form reticulated structures (haze) is reduced.

EXAMPLE 3

Preparation of chitosan salts: Ten percent solids solutions of the following acids in water were prepared: 1) Nitric acid; 2) Acetic acid; 3) Trifluoromethanesulfonic acid; 4) Formic acid; 5) Phosphoric acid; 6) Malic acid. Low molecular weight methylated chitosan was prepared as per 2-a. The preparation sequence was terminated at the point where a washed solid of methylated chitosan was achieved. This wet solid was slurried in sufficient water such that the total weight of slurry was 2000 g. The slurry was divided into ten 200 g portions. Two portions were titrated with 10% nitric acid to an end point at pH 4.75 (±0.05). Equivalents of nitric acid required was 0.0322. Portions of the other acids above containing 0.0322 moles each were combined with portions of the chitosan slurry. In each case, a clear solution resulted. Phosphoric acid acted as a monoprotic acid in dissolving the chitosan. The percent solids was determined by drying a 10 g sample of each chitosan salt solution overnight.

Preparation of sol/chitosan salt mixtures: Mixtures 3-1 through 3-6 were prepared as follows: Ten gram portions of Remasol™ SP-30 were combined with 0.19 g portions of conc. nitric acid. Then the above acid salt solutions were added respectively according to the formula: grams solution= (0.45/solids fraction). Then each mixture was diluted to 100 g total weight with water. In the case of the acetic and malic acids salts, more acid had to be added dropwise to the mixture to attain a clear solution.

Preparation of coated samples: Coated Samples 3-1 through 3-6 were prepared respectively from mixtures 3-1 through 3-6 by draw-down with a #6 wire-wound rod over 6"×12" sheets of corona-treated PET film. Each sample was dried for 5 minutes at 50° C.

Antistatic property: Each sample above had CD of 0.01 sec, and SR of between $1 \times 10^8$ and $5 \times 10^9$ ohms/sq.

Conclusion: The antistatic property of the coated mixtures is not affected by the type of anion used.

EXAMPLE 4

Preparation of sol/chitosan salt mixtures with stannia and titania sols: Mixture 4-1 was prepared: Ten grams of Nalco SN-20 stannic oxide sol (25% Solids) was combined with 12.6 g of chitosan salt solution 2-a. The ensuing thick predipitate was stirred and conc. nitric acid added dropwise until a pH of 3 was reached. Then the mixture was diluted to 100 g total weight with water. The mixture was filtered through a fluted paper filter. Mixture 4-2 was prepared from Nalco Tex.__2588 Titania sol exactly as above.

Preparation of coated samples: Coated Samples 4-1 and 4-2 were prepared by draw-down with a #6 wire-wound rod onto 6"×12" sheets of corona-treated PET film, and dried for 2 minutes at 50° C.

Antistatic result: CD was 0.02 sec for both samples. As a further test for efficacy CD was measured on the non-conductive sample surface opposite to the coated side. Again the CD was 0.02 for each sample.

Conclusion: The antistatic property is not dependent on the use of silica sols but also applies to other anionic metal oxide sols.

EXAMPLE 5

Preparation of sol/cationic amine mixtures: Mixture 5-1: A stock solution of polyethyleneimine (MW= 100,000) containing 6% PEI in water was prepared. To 100 g of this solution, 9.3 g of conc. nitric acid was added (about 70% neutralization of amine groups). Ten grams of Remasol SP-30 was combined with 0.19 g of conc. nitric acid, and 3 g of the partially neutralized PEI solution was added. The mixture was cloudy. One drop of conc. nitric acid added to the mixture caused it to clear. 90 g water and 10 g n-propanol were added to the mixture as diluents. Then 0.19 g of 7.4% formaldehyde/water solution was added. Mixture 5-2: A solution of 2 g of cetyltrimethylammonium bromide (CTAB) in 98 g water was prepared. Ten grams of Rema-sol™ SP-30 was combined with 0.20 g of conc. nitric acid, and 40 g of the 2% CTAB solution was added. A precipitate ensued, which was cleared by the addition of 40 g of methanol. Mixture 5-3: Poly(4-vinylpyridine-co-styrene) (90:10) was mixed with water at 1% solids. To 525 g of the mixture, 4.05 g of conc. nitric acid was added and the mixture was stirred until it was clear. Ten grams of Rema-sol™ SP-30 was combined with 0.19 g of conc. nitric acid and 100 g of 1% PVPy nitrate solution was added. The mixture was initially cloudy but cleared upon stirring for about ten minutes. The mixture was diluted with 100 g water to reduce viscosity.

Preparation of coated samples: Coated Samples 5-1 and 5-2 were prepared by draw-down of mixtures 5-1 and 5-2 respectively with a #6 wire-wound rod onto 6"×12" sheets of corona-treated PET film and dried for 2 minutes at 50° C. Sample 5-3 was produced similarly except that a #16 wirewound rod was used.

Antistatic property: CD of the three coated samples was 0.01 or 0.02 sec. SR was less than $5\times10^9$ ohms/sq. Sample 5-1 was further subjected to photographic processing. CD after processing was 0.20 sec. Sample 5-2 was washed in cold water for 2 minutes. CD after washing was 0.14 sec.

Conclusion: The antistatic property is not limited to the use of chitosan salts, but also extends to other cationic and quaternary amines, both polymeric and monomeric.

What is claimed is:

1. An organic polymeric film having on at least one surface thereof an optically transparent antistatic protection layer of 50 to 1200 nm thickness comprising 1 to 65% by weight solids in said layer of a chitosan acid salt and 99 to 35% by weight solids in said layer of anionic inorganic metal oxide colloidal particles and having a photographic silver halide gelatin emulsion adhered to said antistatic protection layer.

2. The film of claim 1 wherein both sides of said film have said antistatic protection layer thereon and both of said antistatic protection layers have photographic silver halide gelatin emulsion layers adhered thereto.

3. An organic polymeric film having on at least one surface thereof an optically transparent antistatic protection layer of 50 to 1200 nm thickness comprising 1 to 65% by weight solids in said layer of chitosan acid salt and 99 to 35% by weight solids in said layer of anionic inorganic metal oxide colloidal particles and having a photothermographic silver halide gelatin emulsion adhered to said antistatic protection layer.

* * * * *

UNITED STATES PATENT AND TRADEMARK OFFICE
CERTIFICATE OF CORRECTION

PATENT NO. : 5,457,015
DATED : October 10, 1995
INVENTOR(S) : David R. Boston

It is certified that error appears in the above-indentified patent and that said Letters Patent is hereby corrected as shown below:

Column 2, line 28, delete "$10^{9-1011}$" and insert --$10^9$-$10^{11}$--.

Signed and Sealed this

Twenty-seventh Day of February, 1996

Attest:

BRUCE LEHMAN

Attesting Officer     Commissioner of Patents and Trademarks